No. 857,032. PATENTED JUNE 18, 1907.
M. H. CORMACK.
CLUTCH FOR AUTOMOBILES AND OTHER PURPOSES.
APPLICATION FILED MAR. 2, 1906.
2 SHEETS—SHEET 1.
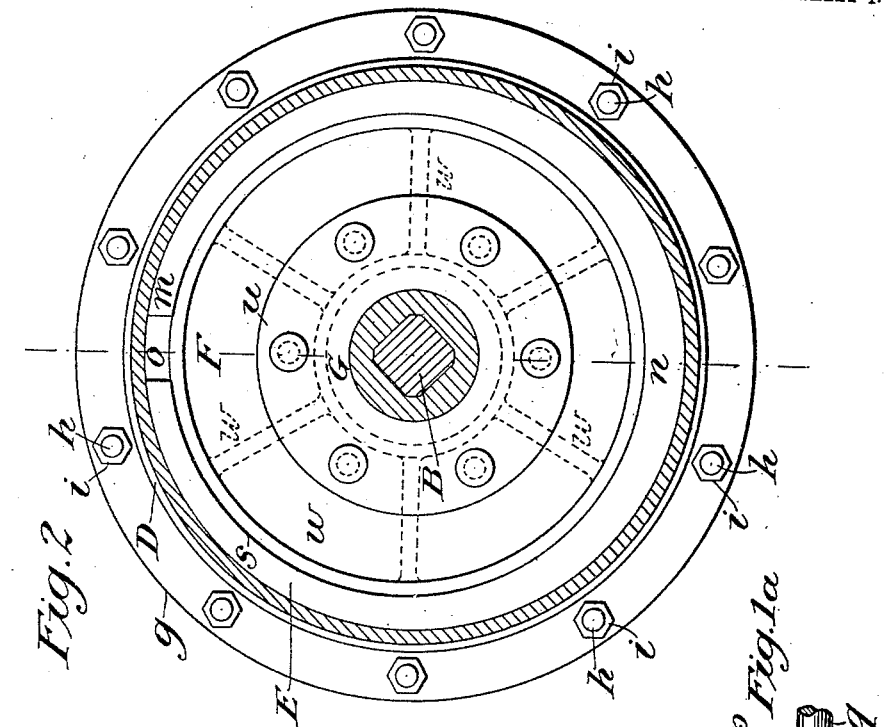
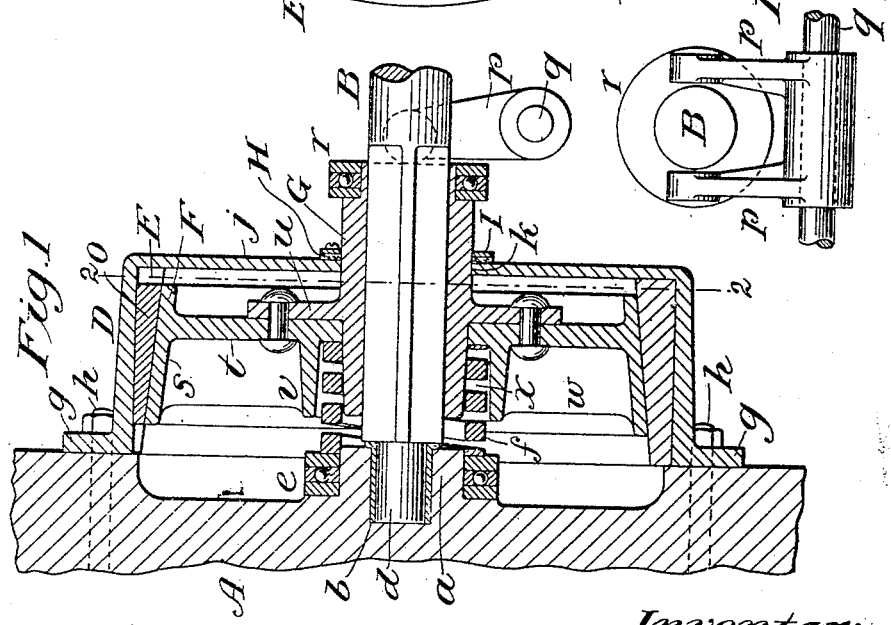
Witnesses:
Chas. D. King.
Inventor:
Maurice H. Cormack
by Wilton C. Donn
Atty.

No. 857,032. PATENTED JUNE 18, 1907.
M. H. CORMACK.
CLUTCH FOR AUTOMOBILES AND OTHER PURPOSES.
APPLICATION FILED MAR. 2, 1906.
2 SHEETS—SHEET 2.
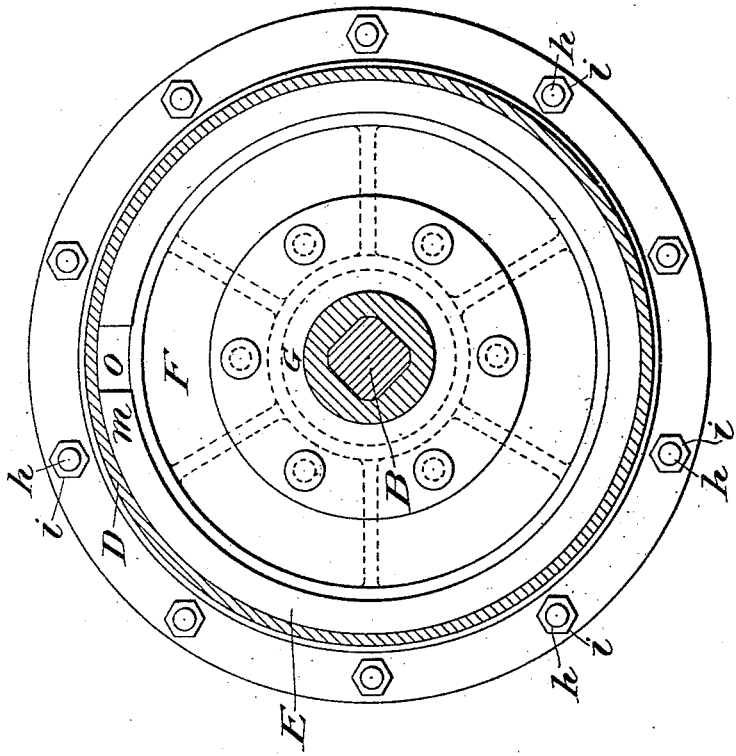
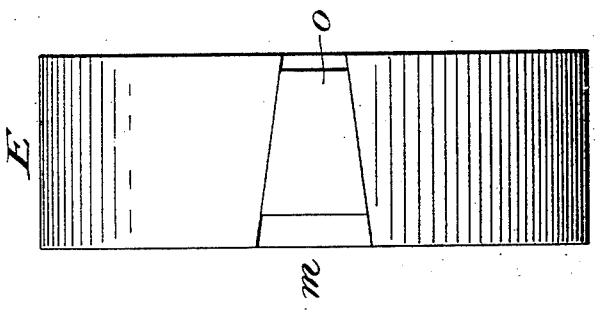

UNITED STATES PATENT OFFICE.

MAURICE H. CORMACK, OF NEW YORK, N. Y., ASSIGNOR TO STANDARD BRAKE COMPANY, OF NEW YORK, N. Y., A CORPORATION OF NEW YORK.

CLUTCH FOR AUTOMOBILES AND OTHER PURPOSES.

No. 857,032.   Specification of Letters Patent.   Patented June 18, 1907.

Application filed March 2, 1906. Serial No. 303,742.

*To all whom it may concern:*

Be it known that I, MAURICE H. CORMACK, a citizen of the United States, residing at New York, borough of Manhattan, in the county and State of New York, have invented new and useful Improvements in Clutches for Automobiles and other Purposes, of which the following is a specification.

This invention has reference generally to clutches for securing continuity between a power driven shaft, for example the crank-shaft of an automobile and the clutch-shaft that connects with the transmission-gear, for the purpose of transmitting power from the driving mechanism to the driven mechanism; and, in the special case of automobiles, to transmit power from the motor to the transmission-gear and through the said gear to the vehicle.

The present invention has particular reference to friction-clutches of that type wherein an expansible ring coacts with a drum connected with or forming part of the fly-wheel or other driving element, and which is expanded into frictional contact and engagement with the drum by means of a head or cone. A clutch of this type is shown in my pending application Ser. No. 302,128, in which the expansion of the ring is brought about by the movement of the head or cone longitudinally against the ring by means supported on the clutch-shaft between the clutch and the transmission-gear, whereby when operated to move the head against the ring a thrust-collar on the clutch-shaft takes up the strain or thrust and through the clutch-shaft transmits it to the transmission-gear, thereby causing friction and interfering with the smooth running of the gear.

The object of this invention is to relieve the clutch-shaft and the transmission gear from the strain which is exerted when the head is moved longitudinally to expand the friction-ring.

A further object of the invention is to arrange these devices so that when the head or cone is moved against the ring the thrust or strain of expanding the friction-ring and holding it in engagement with the drum shall be contained within the casing of the clutch and resisted or sustained by members of the clutch instead of being transmitted to some part or parts of the outside mechanism.

The invention also has for its object to produce a head or cone for expanding the friction-ring in which strength and durability are secured by making the rim and web separate from the hub and providing the hub with a flange by means of which it is fastened to the web of the head and thus strengthens the web at the point where the greatest strain is imposed upon it.

The invention being peculiarly applicable to the clutches of automobiles (but not exclusively so) it is illustrated in connection with the fly-wheel and clutch-shaft of these vehicles, and in the drawings which accompany this specification:—Figure 1 represents a vertical longitudinal section of the clutch-mechanism, the section being taken on a plane through the axis of the clutch-shaft and fly-wheel. Fig. 1ª is a detail of the device for moving the head or cone back to release the friction ring. Fig. 2 is a vertical transverse section of the clutch-mechanism, the section being taken on a plane indicated by the broken lines 2—2 of Fig. 1. Fig. 3 represents the expansion-ring in side elevation. Fig. 4 is a vertical transverse section of the clutch-mechanism, the section being taken on the same plane as Fig. 2, but showing a modification of the expansion friction ring and the head or cone for expanding the same.

Referring to the drawings A designates the section of a fly-wheel of an automobile which is usually mounted on the crank-shaft (not shown). This fly-wheel may constitute the driving element of the clutch. The hub —a— of the fly-wheel on its inner end is bored out to receive the phosphor-bronze bushing —b— which forms the bearing for the journal —d— of the clutch-shaft B. On the exterior periphery of the hub a ball-bearing thrust-collar —e— is mounted and against this a spiral-spring —f— bears by which the head or cone is moved into and against the ring to expand it and hold it normally in frictional contact with the drum or casing D. This drum is a hollow cylinder having its edges provided with a flange —g— which is perforated to receive the ends of the studs —h— which are inserted in the fly-wheel, either by screwing them into tapped holes in the same or by constructing them as bolts and passing them through holes in the fly-wheel. The rim of the drum is fastened to the inner face of the fly-wheel by means of nuts —i— screwed on the ends of the studs which project through the rim. The fly-wheel forms one side of the drum and closes the same on this side, the opposite side being closed by the wall —j— which is preferably cast as an integral part of the drum. The wall —j— has a central circular perforation —k— to permit the hub of the head or cone to be inserted in the drum.

E is the expansible member of the clutch in this instance consisting of a divided expansible ring which is inserted in the drum with its edges between the part of the fly-wheel that projects inside of the rim of the drum, and the wall —j— of the drum. This ring is divided or split transversely at —m— and as shown in Figs. 1 and 2 is of varying thickness, being thinnest at its edges adjacent to the opening —m— and thickest at the diametrically opposite line as at —n—. The increased thickness of the ring is confined to the interior periphery, the exterior periphery being concentric with the periphery of the drum, whereby the internal periphery is rendered eccentric to the axis of the drum. The interior periphery of the ring is also tapered transversely, from its edge which bears against the wall —j— to the edge which bears against the fly-wheel.

F is the head or cone by which the ring is supported and expanded. The periphery of this head is also tapered to the same angle as the interior periphery of the ring but in the opposite direction. The head or cone has also on its periphery between the ends of the ring a wedge-shaped stop —o— which is fastened to or cast on the head. The edges of the ring are parallel to the edges of the wedge-shaped stop and they abut against the same. This wedge-stop prevents the ring from turning and maintains the proper relation between it and the head. The rim of the head is eccentric to the axis of the drum to the same degree as the inner periphery of the expansible ring, its eccentricity being opposite to that of the ring so that the major eccentricity or thickness of the ring corresponds with the minor eccentricity of the head. The head is provided with a hub G which is mounted on the clutch-shaft B. The clutch-shaft is prismatic in cross-section and the opening in the hub is correspondingly shaped so that when the head rotates it carries the clutch-shaft with it.

The spiral-spring —f— is wound around the hub between the web of the head and the thrust-bearing collar —e—. The expansive force of this spring is thus exerted against the web of the head and the latter is thereby moved away from the fly-wheel and its tapered rim is forced against the tapered inner periphery of the friction-ring and expands the latter into frictional engagement with the drum. The drum and fly-wheel being connected together it will be seen that the force exerted by the spring is contained within the clutch-mechanism. That is to say the backward thrust of the spring is sustained by the fly-wheel while the forward thrust is exerted against the movable head. The clutch is thus of that type known as the self-contained clutch. The longitudinal movement of the head or cone with respect to the friction-ring, acting against the oppositely tapered or inclined periphery of the ring may be sufficient to expand the ring into frictional engagement with the drum, but to control the expansion and make it uniform so that the periphery of the ring throughout its entire length will bear with uniform pressure against the internal periphery of the drum, the action of the head or cone may be supplemented by the tangential application of force to the ends of the ring on each side of the opening —m—. This is effected by means of the wedge-shaped stop —o—. The action of this device when the inclined periphery of the head or cone is moved longitudinally against the inclined periphery of the ring is to expand the ring circumferentially against the drum while the head or cone applies its expansive force radially, the two forces combining to effect the expansion and coacting to maintain the circular form of the ring, prevent it from expanding unevenly and causing a perfect frictional contact with the drum.

In order that the wedge-stop and the head or cone may coact simultaneously the angles of the edges of the wedge are preferably equal to the sum of the angles which the tapered peripheries of the rim of the ring and the expansible ring bear to the periphery of the drum so that, when the head is moved longitudinally against the ring and expands it from the inside, the edges of the wedge-stop bear at the same time against the ends of the ring and expand it circumferentially. Normally the spring causes the head to press against the ring constantly and thus maintain frictional contact with the drum, so that continuity is maintained between the driving part of the mechanism and the part to be driven viz., the clutch-shaft and the transmission-gear. This continuity can however, be broken at any moment by means of the forked-lever —p—. This lever is mounted on a shaft —q— which is connected by suitable mechanism with the clutch-treadle. The ends of the lever bear against the ball-bearing thrust-collar —r— on the reduced outer end of the hub G. When the treadle is operated the ends of the forked lever are drawn against the thrust-collar and move the hub longitudinally on the clutch-shaft against the resistance of the spring —f—, and the rim of the head being thereby moved back, the ring is allowed to contract. By this means the frictional contact and engagement of the ring with the drum is gradually reduced and finally completely broken, but, as soon as the clutch-treadle is released, the spring forces the head against the ring, expands it into frictional contact with the drum and re-establishes the continuity between the fly-wheel and the clutch-shaft.

It will be observed that the thrust of the spiral-spring in one direction is borne by the fly-wheel against which one end presses while in the opposite direction the thrust is ultimately borne by the drum owing to the conical head bearing against the expansible member and the latter bearing against the inner periphery of the drum which limits the expansion of the expansible member and, finally, the longitudinal movement of the head. The clutch-shaft and the transmission-gear are thus wholly relieved of the strain and the pressure of the spring.

The rim —s— and web —t— of the head or cone are integral parts of one another, but the hub G is separate. The latter has a circular flange —u— which is parallel to the web. The flange and web are riveted together so that a rigid connection is made between them as shown by Figs. 1 and 2. By making the web and rim of the head separate from the hub and connecting them together by placing the web against the circumferential flange —u— on the hub and riveting the web and flange together, the flange reinforces the web where the spring bears against it and strengthens it at the point where the strain is greatest. Furthermore, if the head should be injured or broken it can be readily removed and replaced by a fresh one, the hub which is not liable to injury being retained and thus the expense of repair will be materially reduced. The web —t— is perforated centrally to admit the inner end of the hub and is provided with a circular flange —v— that projects at right-angles from the web and is connected with the rim —s— by radial ribs —w— that strengthen the head. The circular flange —v— on the web and the hub which it surrounds, form a socket —x—, the inside peripheries of the flange and the hub being tapered so that the socket is slightly wider at its entrance than at its bottom. The spiral spring —f— is coiled in the socket —x—.

The oil for lubricating the clutch-mechanism is placed in the drum, and to prevent leakage, a packing consisting of a fibrous ring H of felt or other suitable material is placed on the outside of the wall —j— around the clutch-shaft under a steel ring I and fastened by means of machine screws.

The modification shown by Fig. 4 consists in making the expansible ring E of uniform thickness throughout its entire length, or, in other words, making both the inner and outer peripheries concentric with the axis of the drum; and the head likewise is made concentric with the axis of the drum. The advantage of making the head and ring eccentric to the axis of the drum is that in expanding the ring will be brought to a true circle but, as the expansion is produced by the combined or coacting operation of the head and the wedge-stop, the eccentricity may without material disadvantage be dispensed with if desirable.

Various modifications may be made of the several parts of the clutch herein described, and it is evident that some of these parts may be used in connection with ordinary friction-clutches, for example the construction herein shown and described of the head with separate hub and a flange to reinforce the web of the head. Furthermore, the invention is not confined to the use of a spring for moving the head longitudinally to expand the friction ring as other devices may be substituted if desirable.

I claim:—

1. In a clutch, the combination, with a driving member and a drum fixed thereto, of a driven shaft journaled in said driving member, an actuating head movable longitudinally along said driven shaft but rotatable therewith, an expansible member compressible against said drum by said actuating head, means interposed between said driving member and said actuating head for normally maintaining said head in clutching engagement, and means mounted independently of said driven shaft for shifting said head in opposition to the action of said means.

2. In a clutch, the combination, with a driving member and a drum fixed thereto, of a driven shaft journaled in said driving member, an actuating head movable longitudinally along said driven shaft but rotatable therewith, an expansible member compressible against said drum by said actuating head, means interposed between said driving member and said actuating head for normally maintaining said head in clutching engagement, and a rock-shaft mounted independently of said driven shaft and carrying a forked lever to engage said head and shift the same in opposition to said first-named means.

3. In a clutch, the combination, with a fly-wheel having a bored hub, of a driven shaft journaled in said hub and freely rotatable therein, an actuating head movable axially along said driven shaft but rotatable therewith, a drum fixed to said fly-wheel and inclosing said head, an expansible member which is forced into engagement with said drum by said head, means acting on said head to normally maintain said parts in such engagement, and means mounted independently of said driven shaft and abutting against the hub of said head whereby said head is moved out of clutching engagement.

4. In a clutch, in combination, a driving member, a driven shaft journaled in said driving member, a hub slidable axially along said driven shaft but keyed thereto in order to rotate therewith, said hub having intermediately of its length an outwardly-extending flange, a web secured to said flange and having a tapered rim-portion integral therewith and an integral flange extending laterally toward said driving member, a helical spring interposed between said web and said driving member and disposed in the socket formed between the flange of said web and said hub, a drum fixed to said driving member and inclosing said web and its tapered rim, an expansible member interposed between said tapered rim and the inner peripheral surface of said drum, and means to shift said hub and the parts secured thereto, in opposition to said spring.

5. In a clutch, in combination, a fly-wheel having a bored hub, a driven shaft freely rotatable in said hub, a head rotatable with said driven shaft but movable axially therealong, a drum fixed to said fly-wheel and inclosing said head with the exception of one end-portion of its hub, an expansible member interposed between said head and said drum, means acting upon said head for normally maintaining said member in engagement with said drum, and means acting upon the end-portion of the hub of said head which extends without said drum to shift said head out of clutching engagement.

In testimony that I claim the invention above set forth, I have affixed my signature in presence of two witnesses.

MAURICE H. CORMACK.

Witnesses:
   HANS AMSHEIN,
   WILTON C. DONN.